(12) United States Patent
Albero et al.

(10) Patent No.: US 12,530,255 B2
(45) Date of Patent: Jan. 20, 2026

(54) SYSTEM, METHODS, AND APPARATUSES FOR IDENTIFYING AND RESOLVING ANOMALOUS DATA WITHIN A DISTRIBUTED NETWORK

(71) Applicant: BANK OF AMERICA CORPORATION, Charlotte, NC (US)

(72) Inventors: George Anthony Albero, Charlotte, NC (US); Naga Vamsi Krishna Akkapeddi, Charlotte, NC (US); Saqib M. Khan, Laurel, MD (US); Murali Bharathan, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 22 days.

(21) Appl. No.: 18/602,696

(22) Filed: Mar. 12, 2024

(65) Prior Publication Data
US 2025/0291669 A1 Sep. 18, 2025

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01); *G06F 11/079* (2013.01)

(58) Field of Classification Search
CPC ............. G06F 11/0793; G06F 11/0709; G06F 11/079; G06N 20/00
See application file for complete search history.

(56) References Cited

U.S. PATENT DOCUMENTS

| | | | |
|---|---|---|---|
| 7,526,670 B2 | 4/2009 | Lloyd | |
| 9,015,843 B2 | 4/2015 | Griffin | |
| 9,141,914 B2 | 9/2015 | Viswanathan | |
| 9,166,999 B1 | 10/2015 | Kulkarni | |
| 9,407,652 B1 | 8/2016 | Kesin | |
| 10,713,151 B1 * | 7/2020 | Zinger | G06F 11/3684 |
| 10,735,448 B2 | 8/2020 | Kesin | |
| 10,742,676 B2 | 8/2020 | Mahaffey | |
| 10,776,196 B2 | 9/2020 | Ohana | |
| 10,986,121 B2 | 4/2021 | Stockdale | |
| 11,343,692 B2 | 5/2022 | Wangler | |

(Continued)

*Primary Examiner* — Elmira Mehrmanesh
(74) *Attorney, Agent, or Firm* — Moore & Van Allen PLLC; Lauren M. Stokes

(57) ABSTRACT

Systems, computer program products, and methods are described herein for identifying and resolving anomalous data within a distributed network, the system configured to detect an event within the distributed network, wherein the event comprises at least one anomaly within the distributed network, identify an application(s) associated with the event, apply data associated with at least one event to a centralized platform, control whether an identified application initiates the capture of at least one real-time snapshot, initiate a real-time snapshot process, extract a key value(s) from each real-time snapshot, compare each extracted key value(s) to an expected value for each corresponding key value, identify the anomaly within the distributed network by identifying data which does not conform to the expected value for each extracted key value, and resolve the at least one anomaly within the distributed network when each extracted key value conforms to the expected value for each key value.

17 Claims, 7 Drawing Sheets

(56) References Cited

U.S. PATENT DOCUMENTS

| | | |
|---|---|---|
| 11,362,910 B2 | 6/2022 | Lin |
| 11,467,922 B2 * | 10/2022 | Shukla ................ G06F 11/1471 |
| 12,067,489 B2 | 8/2024 | Ananthanarayanan |
| 2005/0278703 A1 | 12/2005 | Lo |
| 2011/0055921 A1 | 3/2011 | Narayanaswamy |
| 2012/0054554 A1 * | 3/2012 | Dagan .................. H04L 41/064 |
| | | 714/39 |
| 2014/0165207 A1 | 6/2014 | Engel |
| 2015/0047026 A1 | 2/2015 | Neil |
| 2015/0244732 A1 | 8/2015 | Golshan |
| 2015/0341379 A1 | 11/2015 | Lefebvre |
| 2015/0355957 A1 | 12/2015 | Steiner |
| 2016/0182328 A1 * | 6/2016 | Bhasin ................. H04L 43/067 |
| | | 709/224 |
| 2016/0224400 A1 * | 8/2016 | Shafique ............ G06F 11/3006 |
| 2017/0177272 A1 * | 6/2017 | Ilangovan ............. G06F 3/0631 |
| 2018/0139220 A1 * | 5/2018 | Viswanathan ...... G06F 11/3438 |
| 2018/0373617 A1 * | 12/2018 | Gaier .................. G06F 11/3055 |
| 2021/0084105 A1 | 3/2021 | Shadmon |
| 2021/0200603 A1 * | 7/2021 | Battiprolu ........... G06F 11/3476 |
| 2021/0248042 A1 * | 8/2021 | Sundaram ........... G06F 11/0754 |
| 2022/0004465 A1 * | 1/2022 | Huntley ............. G06F 11/0751 |
| 2022/0067109 A1 * | 3/2022 | Mansoor ............. G06F 16/9535 |
| 2022/0398523 A1 * | 12/2022 | Krishnamoorthy ... G06F 11/079 |
| 2024/0211337 A1 * | 6/2024 | Rani ..................... G06F 11/079 |
| 2024/0303529 A1 * | 9/2024 | Rane ..................... G06N 20/00 |
| 2025/0045144 A1 * | 2/2025 | Puri ................... G06F 11/0793 |

* cited by examiner

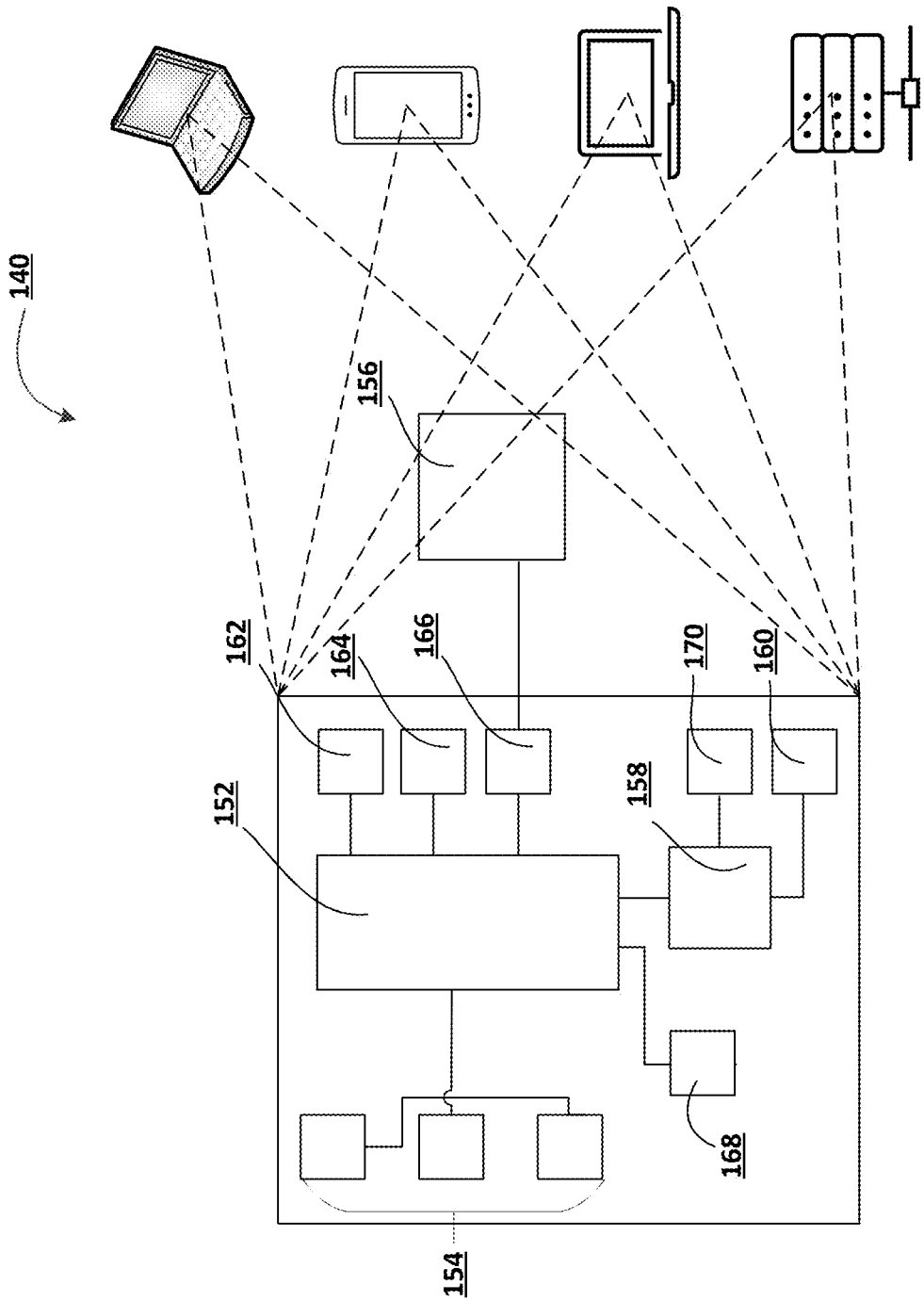

SYSTEM, METHODS, AND APPARATUSES FOR IDENTIFYING AND RESOLVING ANOMALOUS DATA WITHIN A DISTRIBUTED NETWORK

TECHNOLOGICAL FIELD

Example embodiments of the present disclosure relate to system, methods, and apparatuses for identifying and resolving anomalous data within a distributed network.

BACKGROUND

Anomalies within a distributed network cause interruptions to the typical or expected use of applications within the network. Current systems rely on historical data or attempts to replicate the anomaly to identify the root cause. Both approaches produce incomplete results and obfuscate the root cause of the anomaly. Therefore, a need exists for a system to automatically, dynamically, and in real-time capture snapshots of a distributed network environment and identify the root cause of interruptions within the distributed network environment.

Applicant has identified a number of deficiencies and problems associated with identifying and resolving anomalous data within a distributed network. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for identifying and resolving anomalous data within a distributed network.

In one aspect, a system for identifying and resolving network anomalies using a real-time snapshot process is provided. The system comprises at least one non-transitory storage device containing instructions and at least one processing device coupled to the at least one non-transitory storage device, wherein the at least one processing device, upon execution of the instructions, is configured to detect an event within the distributed network, wherein the event comprises at least one anomaly within the distributed network. The at least one processing device, upon execution of the instructions, is also configured to identify at least one application associated with the event. The at least one processing device, upon execution of the instructions, is further configured to apply data from the at least one identified event within the distributed network to a centralized platform. The at least one processing device upon execution of the instructions, is further configured to control whether an identified application initiates the capture of at least one real-time snapshot, wherein the centralized platform communicates to the at least one identified application whether to initiate the capture of at least one real-time snapshot. The at least one processing device, upon execution of the instructions, is also configured to initiate the real-time snapshot process upon the capture of at least one real-time snapshot. The at least one processing device, upon execution of the instructions, is also configured to extract at least one key value from the at least one real-time snapshot. The at least one extracted key value of the real-time snapshot is compared to an expected value for each key value. The at least one processing device, upon execution of the instructions, is further configured to identify an anomaly within the distributed network by identifying data which does not conform to the expected value for each extracted key value. The root cause of the anomaly is resolved when each extracted key value conforms to the expected value for each key value.

In another example embodiment, the at least one processing device, upon execution of the instructions, is configured to assemble a transaction pathway. The transaction pathway is comprised of at least one application which has been labeled as having data associated with a specific event. The at least one processing device, upon execution of the instructions, is also configured to generate a repository comprising at least one key value associated with the event. In various embodiments, the at least one key value of the repository is associated with at least one application of the transaction pathway. At least one key value is extracted from each real-time snapshot. For each extracted key value, the data is filtered according to whether the extracted key value conforms or does not conform to the corresponding key value of the repository. The filtered data is routed through the real-time snapshot process. The real-time snapshot process is updated with data from each real-time snapshot for each cycle of the real-time snapshot process. The at least one processer device, upon execution of the instructions, is configured to resolve the root cause of the anomaly within the distributed network when each extracted key value of the at least one real-time snapshot conforms to the expected value for each corresponding key value of the repository. The data from the real-time snapshot process is stored for a defined period of time. In various embodiment, a machine learning model is trained based on inputs and outputs of the real-time snapshot process.

In various embodiments, the at least one application of the transaction pathway is predetermined by at least one of an application of the transaction pathway or an application external to the transaction pathway.

In various embodiments, each key value of the repository is predefined based on at least one of an expected limit of the key value or an expected performance for each key value.

In various embodiments, the identity of the at least one key value for extraction is predetermined by at least one application or from a source external to the at least one application.

In various embodiments, the real-time snapshot process identifies the root cause of the anomaly using at least one of an updating input or an updating output from the centralized platform, or at least one of an updating input or updating output from the real-time snapshot process.

In various embodiments, a machine learning model accepts numerical and/or natural language processing data types from each of the extracted key values and resolves the root cause of the identified anomaly within the distributed network within at least one iteration.

In various embodiments, a first training set for training a machine learning model is created from at least one of an input or output of the centralized platform, and wherein a second training set for training a machine learning model is created from at least one of an input or output of the real-time snapshot process, and wherein a machine learning model is trained using at least one of the first training set or the second training set.

In various embodiments, data of the at least one application reflects the state of the application at a given point in time, including the infrastructure of the application and/or configuration of the application.

In various embodiments, the centralized platform communicates to the at least one identified application based on the data from the at least one event applied to the centralized platform.

In various embodiments, the event comprises at least one of a market-based event, a memory storage event, and/or an application upgrade event.

In various embodiments, the data associated with the at least one event is converted to a compatible format for application to the centralized platform.

In another example embodiment, a computer program product for identifying and resolving an anomaly within a distributed network is provided. The computer program product comprises at least one non-transitory computer-readable medium having computer-readable program code portions embodied therein, the computer-readable program code portions which when executed by a processing device are configured to cause the processor to detect an event within the distributed network, wherein the event comprises at least one anomaly within the distributed network. The computer-readable program code portions include one or more executable portions also configured to identify at least one application associated with the event. The computer-readable program code portions include one or more executable portions also configured to apply data from the at least one identified event within the distributed network to a centralized platform. The computer-readable program code portions include one or more executable portions further configured to control whether an identified application initiates the capture of at least one real-time snapshot, wherein the centralized platform communicates to each identified application whether to initiate the capture of at least one real-time snapshot. The computer-readable program code portions include one or more executable portions also configured to initiate the real-time snapshot process upon capture of at least one real-time snapshot. The computer-readable program code portions include one or more executable portions further configured to extract at least one key value from each real-time snapshot and to compare each of the at least one extracted key values to an expected value for each key value. The real-time snapshot process identifies the anomaly within the distributed network by identifying data which does not conform to the expected value for each extracted key value. The real-time snapshot process resolves the at least one anomaly within the distributed network when each extracted key value conforms to the expected value for each key value.

In another example embodiment, the computer-readable program code portions include one or more executable portions configured to assemble a transaction pathway. The transaction pathway is comprised of at least one application which has been labeled as having data associated with the event. The computer-readable program code portions include one or more executable portions also configured to generate a repository comprising at least one key value associated with the event. In various embodiments, the at least one key value of the repository is associated with at least one application of the transaction pathway. At least one key value is extracted from each real-time snapshot. For each extracted key value, the data is filtered according to whether the extracted key value conforms or does not conform to the corresponding key value of the repository. The filtered data is routed through the real-time snapshot process. The real-time snapshot process is updated with data from each real-time snapshot for each cycle of the real-time snapshot process. The computer-readable program code portions include one or more executable portions also configured to resolve the root cause of the anomaly within the distributed network when each extracted key value of the at least one real-time snapshot conforms to the expected value for each corresponding key value of the repository. The data from the real-time snapshot process is stored for a defined period of time. In various embodiment, a machine learning model is trained based on inputs and outputs of the real-time snapshot process.

In various embodiments, the at least one application of the transaction pathway is predetermined by at least one of an application of the transaction pathway or an application external to the transaction pathway.

In various embodiments, the real-time snapshot process identifies the root cause of the anomaly using at least one of an updating input or an updating output from the centralized platform, or at least one of an updating input or updating output from the real-time snapshot process.

In various embodiments, a first training set for training a machine learning model is created from at least one of an input or output of the centralized platform, and wherein a second training set for training a machine learning model is created from at least one of an input or output of the real-time snapshot process, and wherein a machine learning model is trained using at least one of the first training set or the second training set.

In still another example embodiment, a method for identifying and resolving an anomaly within a distributed network is provided. The method includes detecting an event within the distributed network, wherein the event comprises at least one anomaly within the distributed network. The method further includes identifying at least one application associated with the event. The method also includes applying data from the at least one event to a centralized platform. The method further includes controlling whether an identified application initiates the capture of at least one real-time snapshot, wherein the centralized platform communicates to each identified application to initiate the capture of at least one real-time snapshot. The method further includes initiating the real-time snapshot process upon capture of at least one real-time snapshot. The method also includes extracting at least one key value from each real-time snapshot and to compare each of the at least one extracted key values to an expected value for each corresponding key value. The real-time snapshot process identifies the anomaly within the distributed network by identifying data which does not conform to the expected value for each extracted key value. The real-time snapshot process resolves the at least one anomaly within the distributed network when each extracted key value conforms to the expected value for each corresponding key value.

In another example embodiment, the method includes assembling a transaction pathway. The transaction pathway is comprised of at least one application which has been labeled as having data associated with the event. The method further includes generating a repository comprising at least one key value associated with the event. In various embodiments, the at least one key value of the repository is associated with at least one application of the transaction pathway. At least one key value is extracted from each real-time snapshot. For each extracted key value, the data is filtered according to whether the extracted key value conforms or does not conform to the corresponding key value of the repository. The filtered data is routed through the real-time snapshot process. The real-time snapshot process is updated with data from each real-time snapshot for each cycle of the real-time snapshot process. The method further includes resolving the root cause of the anomaly within the distributed network when each extracted key value of the at least one real-time snapshot conforms to the expected value for each corresponding key value of the repository. The data from the real-time snapshot process is stored for a defined period of time. In various embodiments, a machine learning model is trained based on inputs and outputs of the real-time snapshot process.

In various embodiments, the at least one application of the transaction pathway is predetermined by at least one of an application of the transaction pathway or an application external to the transaction pathway.

In various embodiments, the real-time snapshot process identifies the root cause of the network anomaly using at least one of an updating input or an updating output from the centralized platform, or at least one of an updating input or updating output from the real-time snapshot process.

In various embodiments, a first training set for training a machine learning model is created from at least one of an input or output of the centralized platform, and wherein a second training set for training a machine learning model is created from at least one of an input or output of the real-time snapshot process, and wherein a machine learning model is trained using at least one of the first training set or the second training set.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
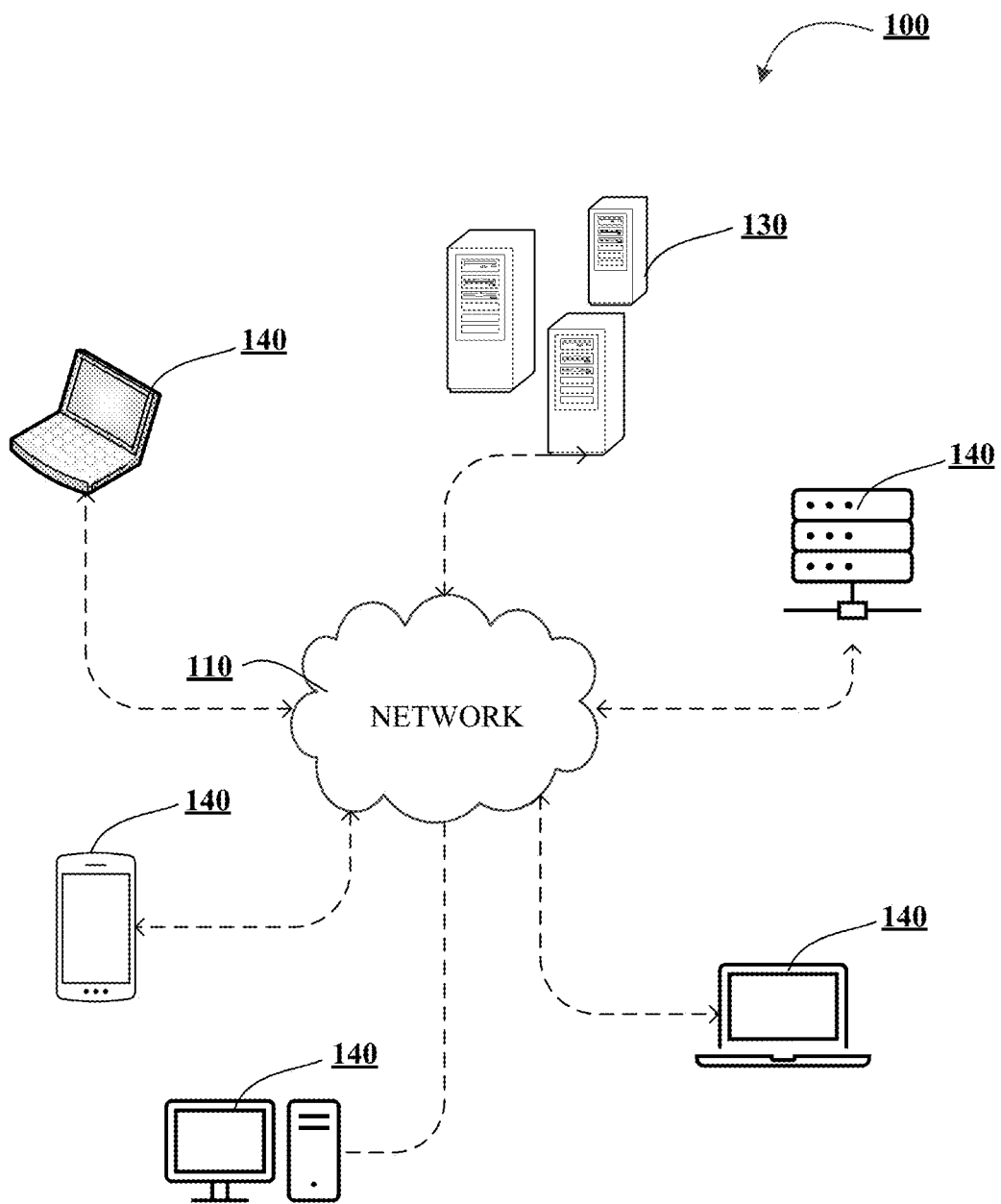
Figure 1B:
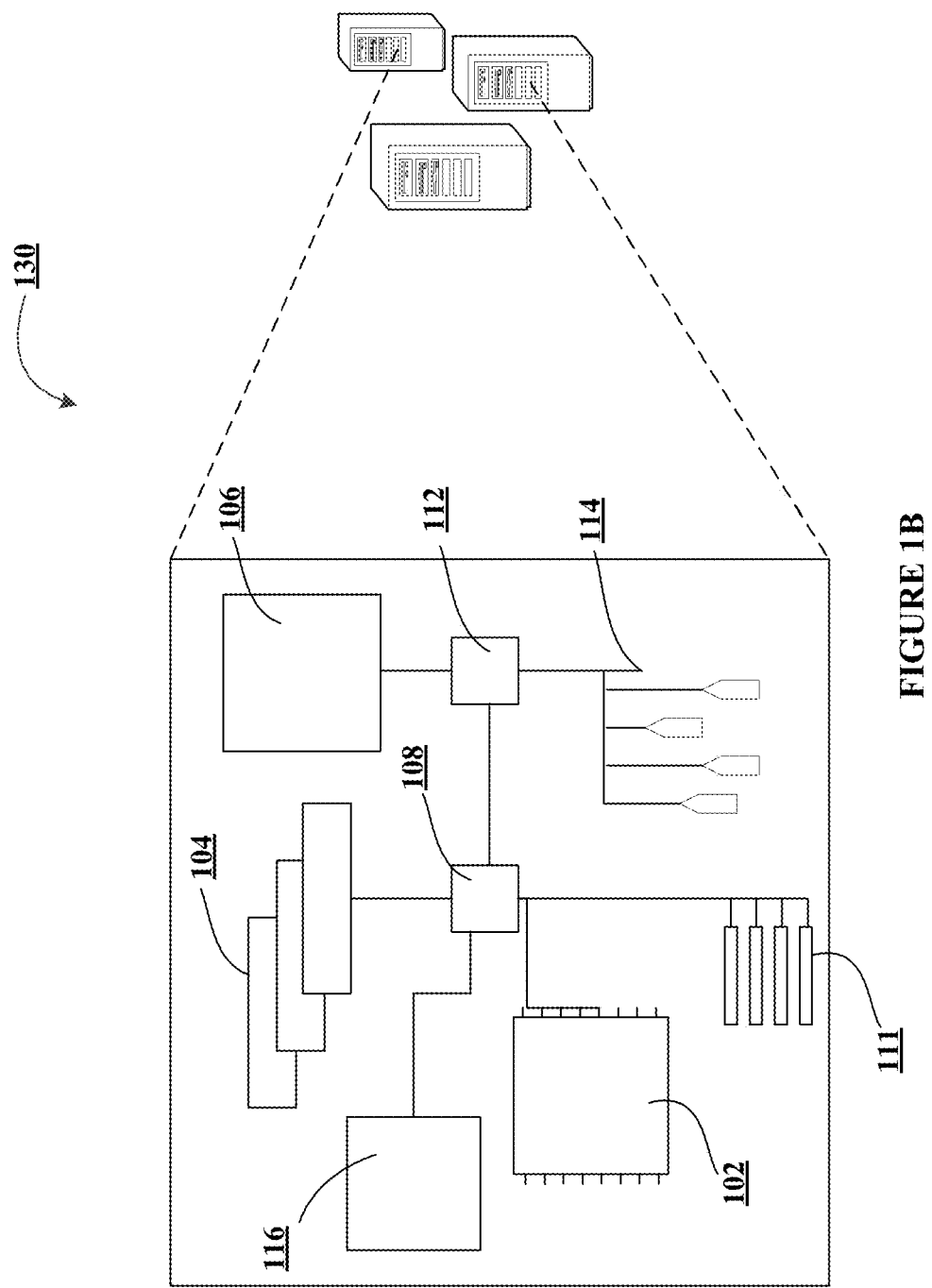
Figure 2:
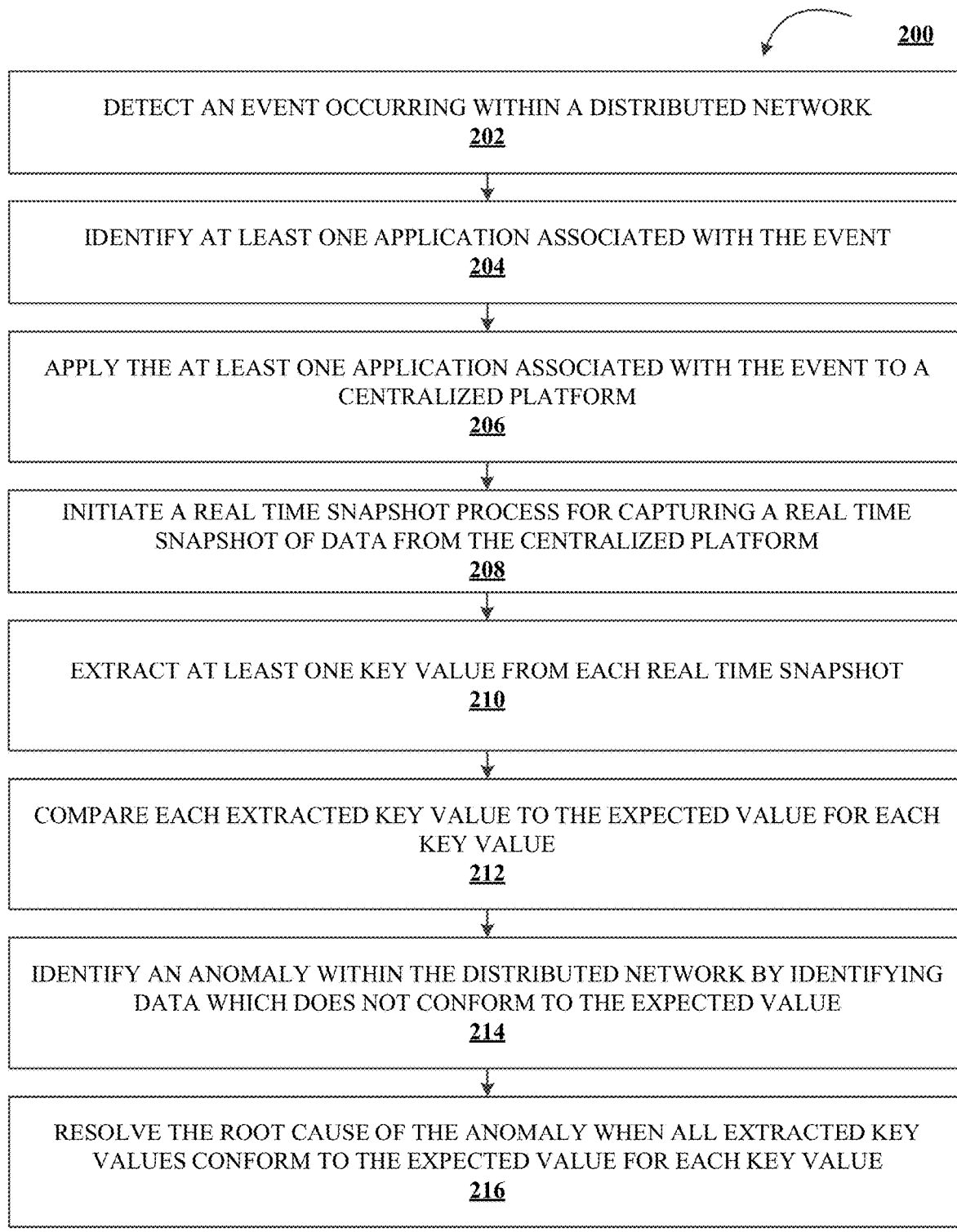

FIGS. 1A-1C illustrates technical components of an exemplary distributed computing environment for identifying and resolving anomalous data within a distributed network, in accordance with an embodiment of the disclosure;

FIG. 2 illustrates a process flow for identifying and resolving anomalous data within a distributed network, in accordance with an embodiment of the disclosure.

Figure 3:
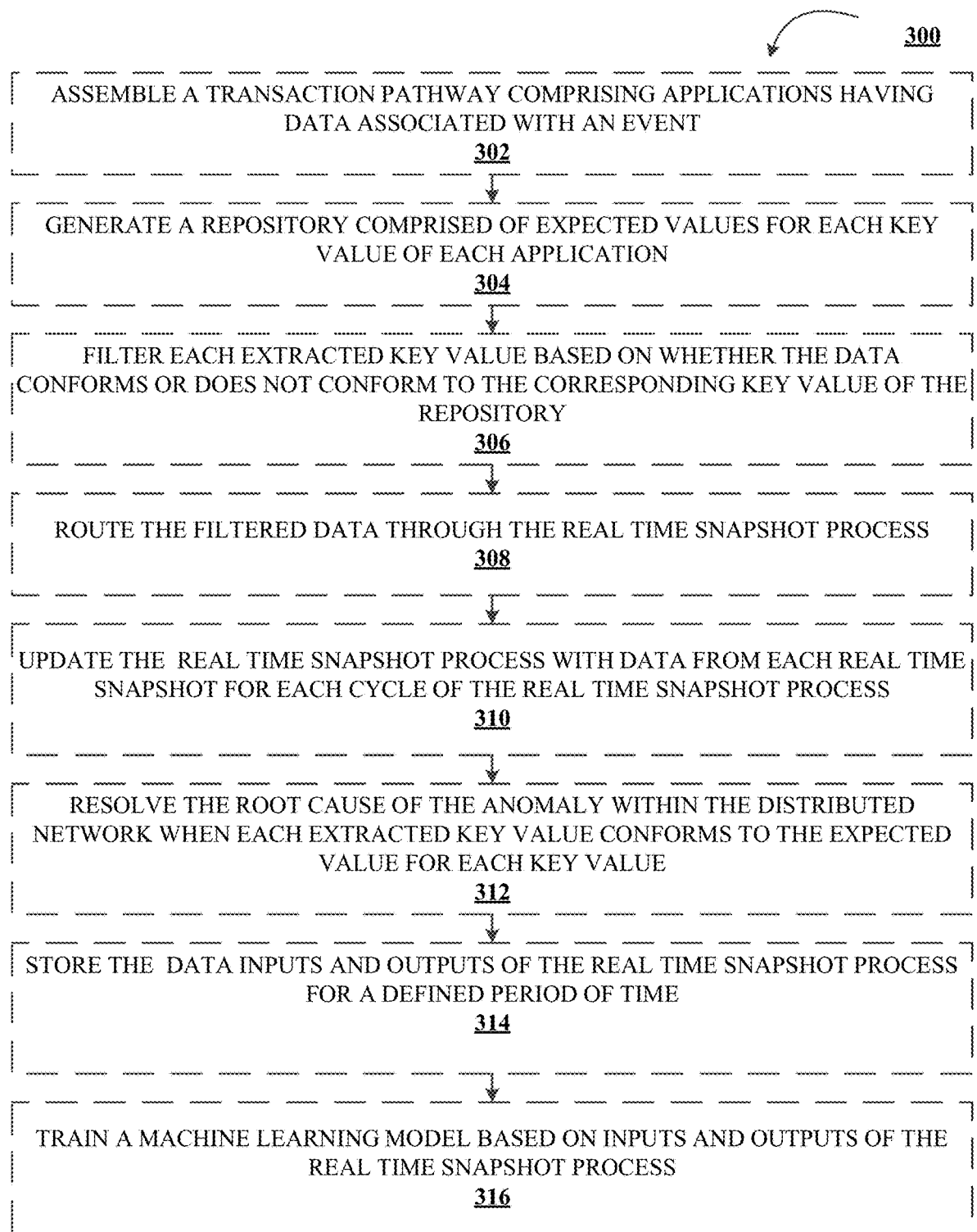

FIG. 3 illustrates an exemplary process flow for resolving an anomaly within a distributed network and training a machine learning model based on inputs and outputs of the real time snapshot process, in accordance with an embodiment of the disclosure.

Figure 4:
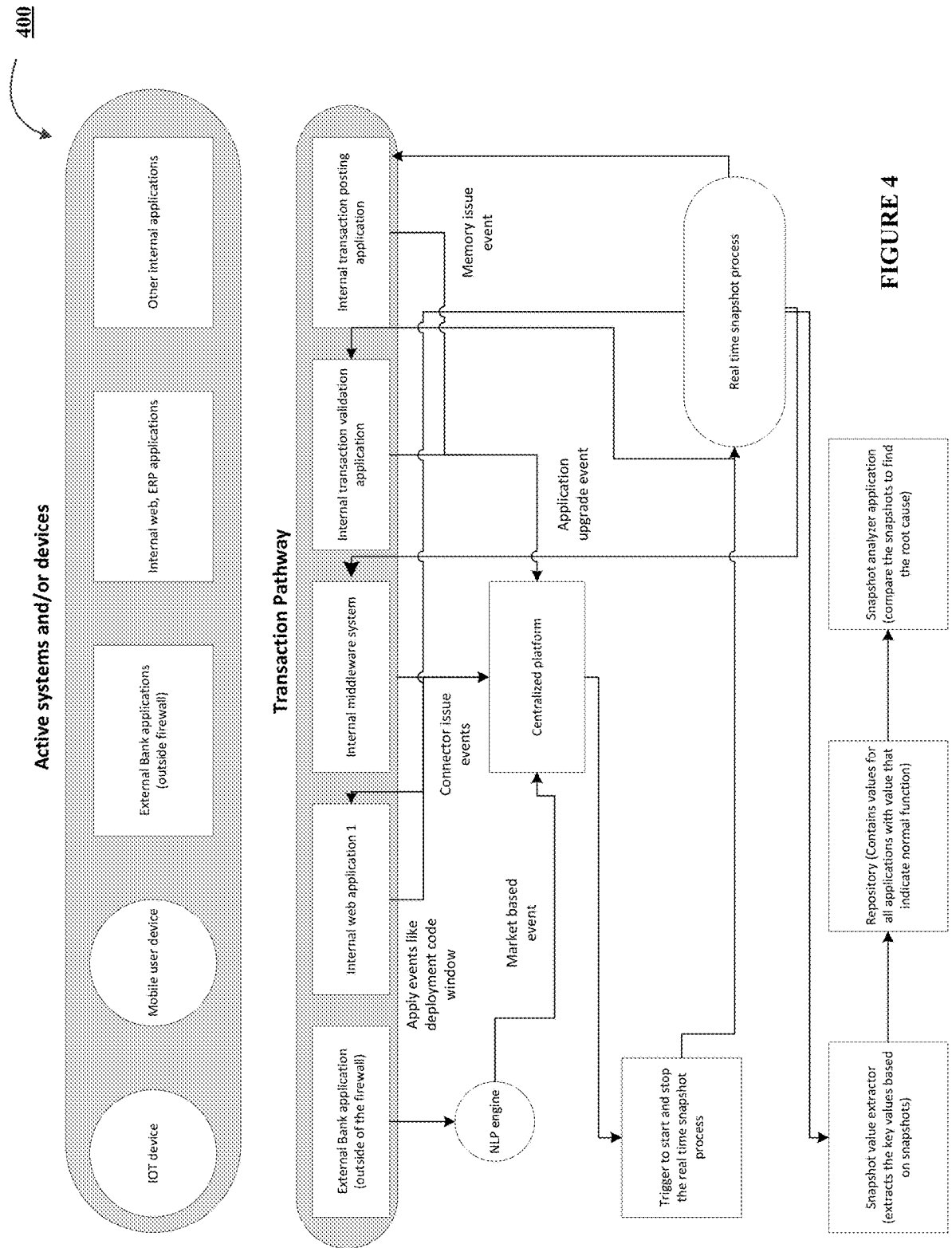

FIG. 4 illustrates an exemplary architecture for identifying a network anomaly within a distributed network, in accordance with an embodiment of the disclosure.

Figure 5:
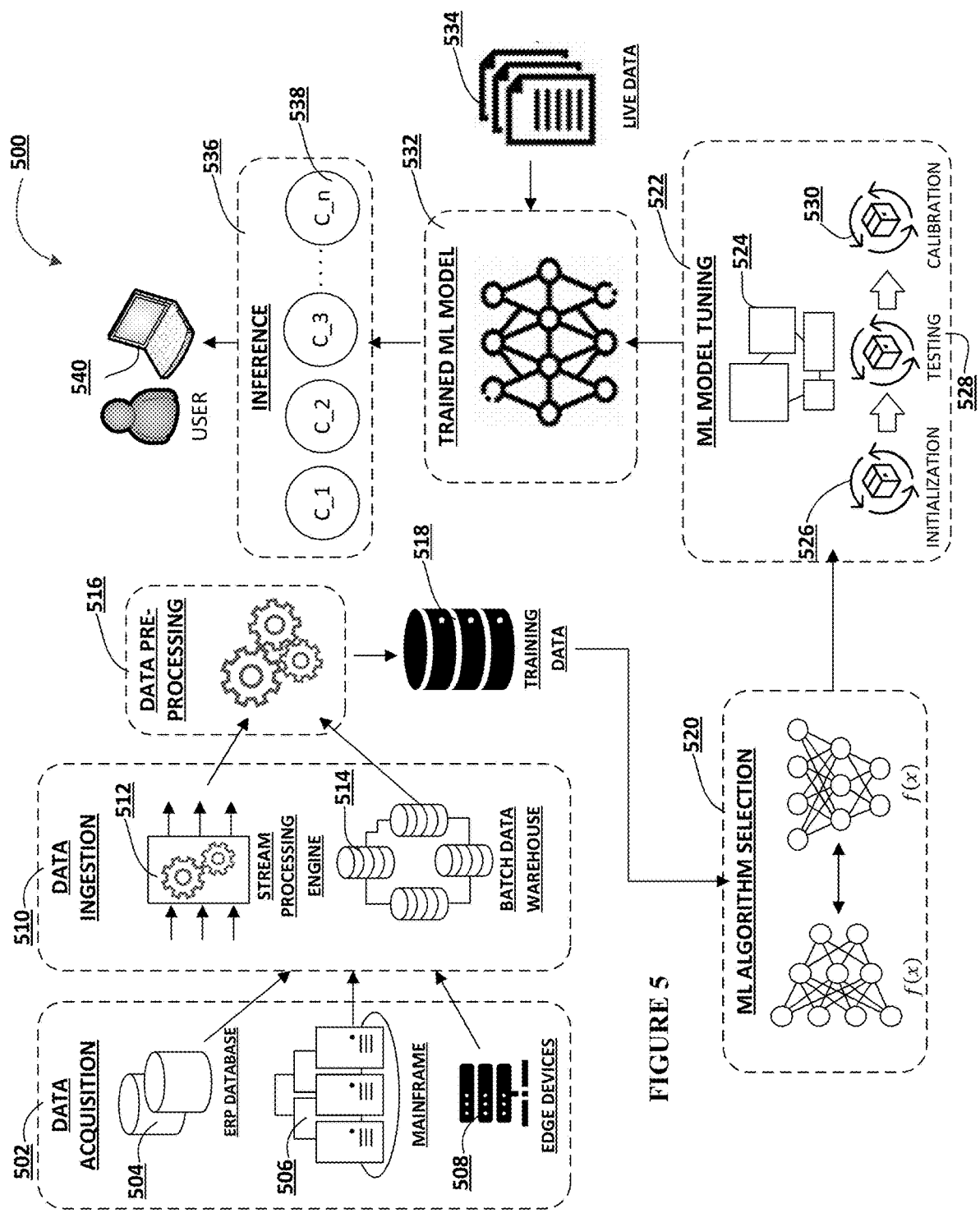

FIG. 5 illustrates a machine learning architecture, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As described in further detail herein, the present disclosure provides a solution to the above-referenced problems encountered in identifying and resolving anomalies within a distributed network. Systems rely on historical data or replication of the computing environment to identify the root cause of a network anomaly. Historical data is stored at a set frequency, leaving gaps in the data collected, and attempts at replicating the computing environment are inherently limited by the challenge of simulating the precise computing environment which caused the network anomaly.

Accordingly, the present disclosure provides for a system which resolves the root cause of an anomaly identified within a distributed network. The system identifies an event occurring within the distributed network. The event causes at least one application within the distributed network to perform outside of its expected limits and/or performance. Applications associated with the event are identified. Data from the at least one event is applied to a centralized platform, which collects all data associated with the event. The centralized platform communicates to the at least one identified application whether to initiate the capture of at least one real-time snapshot. The real-time snapshot process is initiated upon the capture of at least one real-time snapshot. The real-time snapshot process captures the current state of the data from the centralized platform. Key values of each snapshot are extracted and compared to the expected value for each extracted key value. Each extracted key value is identified as conforming to the expected value or non-conforming to the expected value. The network anomaly is resolved when each extracted key value conforms to the expected key value.

The present disclosure provides a real-time snapshot system for identifying and resolving anomalies within a distributed network. The system identifies and resolves the root cause of the anomaly using an iterative approach. An event is first detected within the distributed network, and applications associated with the event are identified. A centralized platform signals to each identified application whether to initiate the capture of real-time snapshots. The centralized platform controls whether the real-time snapshot process is active or inactive for each identified application. The capture of at least one real-time snapshot initiates the real-time snapshot process. The real-time snapshot process receives inputs from the centralized platform. Key values are extracted from each snapshot and are then compared to the expected value for each extracted key value. The system parses through each real-time snapshot for data which does not conform to the expected value for each extracted key value. Nonconforming data is routed back through the real-time snapshot process until each extracted key value conforms to its expected value. The network anomaly is resolved when each extracted key value conforms to its expected value. Inputs and outputs from the real-time snapshot process may be used to train a machine learning model.

What is more, the present disclosure provides a technical solution to a technical problem. As described herein, the technical problem includes relying on backup systems or replication modes to determine the root cause of anomalies in a distributed network, which at most provides an incomplete picture of the root cause. The technical solution presented herein allows for the identification and resolution of anomalies within a distributed network using a real-time snapshot process to identify the root cause of the anomaly. In particular, the real-time snapshot process is an improvement over existing solutions to the identification and resolution of network anomalies, (i) with fewer steps to achieve the solution, thus reducing the amount of computing resources, such as processing resources, storage resources, network resources, and/or the like, that are being used (e.g. training a machine learning model to identify the data necessary for resolving the network anomaly such that the real-time snapshot process resolves the network anomaly in an efficient number of cycles); (ii) providing a more accurate solution to problem, thus reducing the number of resources required to remedy any errors made due to a less accurate solution (e.g., by retraining the machine learning model based on previous snapshots and identifications of root causes); (iii) removing manual input and waste from the implementation of the solution, thus improving speed and efficiency of the process and conserving computing resources (e.g. by training a machine learning model to automatically initiate the real-time snapshot process and/or to automatically end the process when the network anomaly is resolved); (iv) determining an optimal amount of resources that need to be used to implement the solution, thus reducing network traffic and load on existing computing resources (e.g. by training a machine learning model to filter data outputs of the centralized platform and to identify the data needed for resolving the network anomaly). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for identifying and resolving anomalous data within a distributed network 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in some embodiments includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may activate an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for identifying and resolving anomalous data within a distributed network, in accordance with embodiments of the disclosure. In some embodiments, a system (e.g., similar to one or more of the systems described herein with respect to FIGS. 1A-1C) may perform one or more of the steps of process flow 200. For example, a system (e.g., the system 130 described herein with respect to FIG. 1A-1C) may perform the steps of process 200. Additionally, and in some embodiments, a system (e.g., the system 500 described herein with respect to FIG. 5) may be used to perform the steps of process 200.

As shown in block 202, the process flow 200 may include the step of detecting an event occurring within a distributed network. An event is defined as a disruption to the expected function of an application. In some embodiments, an event may occur or be identified as occurring to an application and such an application may be internal or external to the distributed network. For instance, the event may originate from an application on a user mobile device. In some embodiments, the event may comprise at least one anomaly. For instance, the event may comprise any combination of a memory event, an upgrade event, a connectivity event, a market-based event, and/or an unauthorized access event.

In some embodiments, the event causes the anomaly within the distributed network, which comprises one or more applications. For instance, the event itself may cause at least one key value of an application to not perform as expected and/or to go outside of the expected limits for the key value. Such a key value is described in further detail below. For example, a memory event may prevent the storage of data from at least one application and/or an application upgrade event may disrupt the upgrade of the at least one application. Further, an occurrence of the event may result in the disruption of a resource transfer between the user and an entity or a resource transfer between multiple users. For example, the user may be prevented from using a payment instrument to effectuate a resource transfer. In some embodiments, the event comprises unauthorized access to a user's and/or entity's data. For instance, the event may comprise the detection of malware, a cyberattack, and/or a memory leak. In some embodiments, the system may detect the event by processing data from each application and/or data upstream from the event. The system may detect an event in reference to a predefined set of instructions, which are defined in at least one application. For example, the system may detect a memory event by reference to defined storage limits as defined by at least one application and determining that the storage limits have been exceeded by at least one application.

In some embodiments, an event comprises a plurality of at least one of related or unrelated events. In some embodiments, a plurality of events is processed in parallel, which comprises a plurality of real-time snapshot processes occurring individually and/or at the same time. In some embodiments, the plurality of events is related and may be processed as a combined real-time snapshot process. For instance, a disruption to an application on a user device results from a plurality of events, including any combination of a market-based event, a memory leak event, exceeded limits of data storage space, and/or a block to network connectivity on a user device. The plurality of events may be related or unrelated to each other and may be processed individually and/or as a combined real-time snapshot process. In other embodiments, a plurality of events may occur individually and/or concurrently. For instance, a first event occurs at the same time as a second event, and a third event, but each of event one, event two, and event three are processed through the real-time snapshot process individually. In this embodiment, a plurality of real-time snapshot processes, corresponding to each event, are occurring at the same time. In some embodiments, each of the plurality of events are related to each other in some manner (e.g., based on a shared application interruption, a shared computing component that has been interrupted, a shared user account interruption, and/or the like). For instance, a first event and a second event have a causal relationship and are processed as a combined real-time snapshot process, wherein initiation of the real-time snapshot process by a first event causes the initiation of the second event. In some embodiments, the real-time snapshot process accepts the data from each real-time snapshot of each application, including data from applications internal or external to the distributed network. Such a centralized platform is described in further detail below.

As shown in block 204 the process flow 200 may include the step of identifying at least one application associated with the event. In some embodiments, the at least one application comprises an identifier that is a marker for an association between the application and the event. In this embodiment, the identifier is automatically stored in the application upon occurrence of the event, which then signals the association of the application with the event. For example, a first event causes the generation of a first identifier within a first application which signals the association between the first event and the first application. In some embodiments, each application may be encoded with a plurality of identifiers associated with a plurality of predetermined events, and the occurrence of at least one event generates the identifier associated with that specific event. For example, a first application is encoded with a first identifier associated with a first event, a second identifier associated with a second event, and/or the like. In some embodiments, a person may manually encode at least one application with at least one identifier. In some embodiments, a person in a managerial role or a person having a different role may manually encode at least one application with at least one identifier. Further, and in some embodiments, data associated with at least one event is applied to the centralized platform, such as the process described below with respect to block 206, which is described in further detail below.

As shown in block 206, the process flow 200 may include the step of applying data associated with at least one event to a centralized platform. Additionally, and based on this application of the data associated with the at least one event to the centralized platform, a real-time snapshot process may be initiated, which is the process described below with respect to block 210, and which is described in further detail below. As used herein, a centralized platform may comprise a distributed ledger and/or a layer of a distributed ledger. In some embodiments, data from at least one event is at least one of inputted, published, posted, or manually encoded to the centralized platform. In some embodiments, a machine learning model automatically posts or publishes an event to the centralized platform. In some embodiments, a person manually inputs the data of the event to the centralized platform. For instance, a person in a managerial role and/or a person having a different role manually inputs the data of the event to the centralized platform. In some embodiments, a user of a mobile device may manually input data of an event to a centralized platform.

As shown in block 208, the process flow 200 may include the step of controlling whether the at least one identified application initiates the capture of real-time snapshots. In some embodiments, the centralized platform communicates to the at least one identified application whether to initiate the capture of at least one real-time snapshot. In some embodiments, the centralized platform communicates with at least one identified application to initiate the capture of real-time snapshots of the data of the application. In some other embodiments, the centralized platform communicates to the at least one identified application to cease the capture of the real-time snapshots. In some embodiments, the at least one application may cease the capture of real-time snapshots because the real-time snapshot process, as described below with respect to block 218, has resolved. In some other embodiments, the capture of real-time snapshots by at least one identified application ceases because the quota of data for identifying and resolving the network anomaly, as described below with respect to block 216, has been met and no further data is needed. In some embodiments, some applications of the identified applications are engaging in capturing real-time snapshots and some applications have ceased capturing real-time snapshots at the same time. For example, the centralized platform has communicated to a first application to initiate the capture of real-time snapshots, and the centralized platform has communicated to a second application to cease the capture of real-time snapshots, and/or the like. In some embodiments, the centralized platform also sets a frequency for the capture of real-time snapshots by at least one identified application. For example, the centralized platform may set a frequency of on snapshot every minute, every two minutes, and/or the like.

As shown in block 210, the process flow 200 may include the step of initiating a real-time snapshot process. As used herein, the system comprises, runs, and manages the real-time snapshot process. In some embodiments, the real-time snapshot process is activated by a block to a user-initiated action within a computerized environment. In this embodiment, the at least one of exceeding limits of memory storage space, a block to network connectivity, and/or crash detection initiates the real-time snapshot process. In some embodiments, the real-time snapshot process is activated by an unauthorized action occurring within a computerized environment. For instance, the unauthorized event may comprise one of a memory leak, malware activity, and/or a lack of authorized credentials. The real-time snapshot process captures a real-time snapshot, which reflects the present state of the data, and extracts at least one key value from each real-time snapshot. A key value is a value which is identified as being directed to the expected or normal function of the application. A key value is distinguished from other values of an application because key values are indicators of whether the application is functioning as expected. In some embodiments, restoration of each extracted key value to its expected value resumes the expected functioning of the application.

As shown in block 212, the process flow 200 may include the step of extracting at least one key value from each real-time snapshot. Key values are extracted from each application and compared to an expected value for each key value, which is predefined in at least one of an internal and/or external application. In some embodiments, the expected value for each key value is predefined based on the expected limits of the key value and/or the expected performance of the key value. The expected limits and/or expected performance of each key value may be defined in at least one application. In some embodiments, the identity of each key value for extraction is predefined by an application internal and/or external to the real-time snapshot process.

In some embodiments, internal applications operate within a data encrypted computerized environment. For example, an application on a mobile device is external to the real-time snapshot system. In this embodiment, the identity of each key value is associated with a data type predetermined for identifying and resolving the anomaly within the distributed network. In some embodiments, the identity of each key value is manually input by a person in a managerial role and/or a person holding a different role.

As shown in block 214, the process flow 200 may include the step of comparing each extracted key value to the expected value for each key value. In some embodiments, each extracted key value is identified to be either conforming or nonconforming to the expected value of the key value. The expected value may be determined by the defined limits of the key value, the expected performance of the key value, and/or the optimal performance of the key value. For example, a defined limit denotes an edge value for within which the key value is operating as expected. Further, for example, the expected performance of the key value may describe how the user expects to experience the at least one application (e.g., performing a system upgrade on a mobile device and/or effecting a resource transfer between multiple users and/or between an entity and a user).

As shown in block 216, the process flow 200 may include the step of identifying an anomaly within a distributed network by identifying data which does not conform to the expected value. Each extracted key value of the real-time snapshot is identified as either conforming or nonconforming to the corresponding expected value for each extracted key value. Nonconforming data is identified as data comprising at least one anomaly and is routed through the real-time snapshot process until the data conforms to the expected value for each extracted key value. In some embodiments, the real-time snapshot process is iterative, and outputs from the real-time snapshot process provide updated inputs for the next cycle. For each cycle, the output approaches the expected value for each extracted key value. In this embodiment, each cycle brings the real-time snapshot process closer to identification and resolution of the at least one anomaly within the distributed network. In some embodiments, the data goes through only one cycle of the real-time snapshot process before reaching the expected value for each corresponding key value.

As shown in block 218, the process flow 200 may include the step of resolving the root cause of the anomaly when all extracted key values conform to the expected value for each key value. In some embodiments, the system comprises a plethora of possible root causes. In this embodiment, the network anomaly arises from the occurrence of at least one root cause of the plethora of root causes. The process of routing data through the real-time snapshot process may refine the possible root causes of the anomaly with each cycle of the real-time snapshot process. The network anomaly is resolved when each extracted key value conforms to the expected value for each extracted key value. The anomaly within the distributed network is resolved when each extracted key value conforms to the corresponding expected value of the repository. In some embodiments, the at least one anomaly within the distributed network is resolved when a plurality of extracted key values from a plurality of real-time snapshots conform to a plurality of expected values.

In one instance, real-time snapshots capture the state of data associated with a first event individually, data associated with a second event individually, data associated with a third event individually, and so on. In this example, the network anomaly is resolved when each of the plurality of extracted key values from each individual real-time snapshot process conform to the corresponding expected value for each key value. In another example, real-time snapshots capture the state of data associated with both a first event and a second event, wherein the first and second events have a causal relationship. In this example, the state of data associated with a second event depends from the state of data associated with a first event. In this embodiment, resolution of the network anomaly requires the conformity of each extracted key value from each real-time snapshot of data associated with a first event and data associated with a second event, or some combination of data associated with first event and second event, with each key value of the repository.

FIG. 3 illustrates an exemplary process flow 300 for resolving a network anomaly and training a machine learning model, in accordance with embodiments of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. Additionally, and in some embodiments, a system (e.g., the system 500 described herein with respect to FIG. 5) may be used to perform the steps of process 300.

In some embodiments, and as shown in block 302, the process flow 300 may include the step of assembling a transaction pathway comprising applications having data associated with an event(s). The transaction pathway collects applications labeled as having a data type associated with the identification and resolution of an anomaly within the distributed network. In some embodiments, a plurality of events may occur at the same time with each event of the plurality of events being associated with a transaction pathway. Further, and in some embodiments, a transaction pathway may be assembled for each event of the plurality of events such that each event is singularly processed. For example, a first application is associated with a first event and composes a first transaction pathway, a second application is associated with a second event and composes a second transaction pathway. In this embodiment, the first and second transaction pathways operate individually. In some embodiments, events of a transaction pathway may have a relationship with at least one other event. For example, the first and second events depend from each other. For example, a first event and second event have a causal relationship, wherein the second event depends on the first event. In this embodiment, the transaction pathways for the first and second events are processed according to the relationship between the first and second events.

In some embodiments, the applications of the transaction pathway are predetermined by an application internal or external to the transaction pathway. In some other embodiments, the real-time snapshot process receives data upstream from the event. In this embodiment, the data upstream of the event is applied to the centralized platform. Data upstream from the event may be used by a machine learning model to detect an event prior to the occurrence of the event and/or to improve the detection of the event. For example, data upstream from the event may be predictive of the occurrence of the event and/or provide additional data to the real-time snapshot process for identifying and resolving the at least one anomaly in the distributed network.

In some embodiments, and as shown in block 304, the process flow 300 may include the step of generating a repository comprised of expected values for each key value of each application. The repository comprises an expected value for each key value. In some embodiments, there are a plurality of repositories corresponding to a plurality of events. For instance, a first repository is associated with a first event, a second repository is associated with a second event, and/or the like. In some embodiments, there is one repository associated with a plurality of events. For example, a first repository comprises the expected values for each key value associated with a first event, a second event, a third event, and/or the like. In this instance, the repository contains key values for all such events, wherein the contents of the repository are predefined in an internal or external application. Each real-time snapshot process is selective of the key values for extraction and the corresponding key value of the repository.

In some embodiments, and as shown in block 306, the process flow 300 may include the step of filtering each extracted key value based on whether the data conforms or does not conform to the corresponding key value of the repository. In some embodiments, the real-time snapshot process filters outgoing data from the centralized platform by comparing the value of the extracted key value to the corresponding value of the repository. Conforming data is data which is the same as the expected value for each extracted key value, and nonconforming data is not the same as the expected value for each extracted key value. The real-time snapshot process may determine a data type for processing. For example, the real-time snapshot process may determine the type of data accepted as an input to the process. In some embodiments, the real-time snapshot process accepts both conforming and nonconforming data types. Further, in some embodiments, the real-time snapshot process may accept only nonconforming data as an input.

In some embodiments, the real-time snapshot process filters incoming data by data type. In some embodiments, the data type is numerical. The real-time snapshot process may be based on a numerical model within a computerized environment, including coding environments like python and the like, which is designed to accept updating numerical data to continuously approach a normalized state of each key value. In some embodiments, the numerical model is a custom model designed by a person in a managerial role or a person of some other role. In other embodiments, both numerical and natural language processing models are accepted as inputs to the real-time snapshot process for identifying and resolving the network anomaly, either through individual pathways and/or communication between the models. In this embodiment, natural language processing data is a text data format.

In some embodiments, and as shown in block 308, the process flow 300 may include the step of routing the filtered data through the real-time snapshot process. In some embodiments, nonconforming data, or data comprising at least one anomaly, is routed through the real-time snapshot process until each extracted key value conforms to its expected value. For example, a first data type is routed through the real-time snapshot process for a first cycle, and if at least one extracted key value remains nonconforming, the first data type is routed through the real-time snapshot process for a second cycle, and so on until each extracted key value conforms to the corresponding key value of the repository. In some embodiments, nonconforming data is routed through the real-time snapshot process for at least one cycle before the at least one network anomaly is identified and resolved. In some embodiments, both conforming and nonconforming data types are routed through the real-time snapshot process. Further, in some embodiments, a plurality of related events with a plurality of extracted key values is routed through the real-time snapshot process until each extracted key value, from the plurality of key values, conforms to the corresponding key value of the repository.

In some embodiments, and as shown in block 310, the process flow 300 may include the step of updating the real-time snapshot process with data from each real-time snapshot for each cycle of the real-time snapshot process. In some embodiments, a first output of a first cycle of the real-time snapshot process operates as a second input to the real-time snapshot process and updates the second output of a second cycle, and/or the like. In some embodiments, the output of the real-time snapshot process is routed to an application of the transaction pathway (e.g., such as the process described above with respect to block 302) and applied to the centralized platform, wherein the data from the centralized platform is accepted as an input to the real-time snapshot process. In this manner, the filtered data disclosed with respect to block 302 is used to update the real-time snapshot process cyclically and upon each iteration of the process described above with respect to blocks 302-310 until the most-recent extracted key value conforms to the expected key value.

In some embodiments, and as shown in block 312, the process flow 300 may include the step of resolving the root cause of the anomaly within the distributed network when each extracted key value conforms to the expected value for each key value. In some embodiments, each cycle of the real-time snapshot process refines the possible root causes of the anomaly. A first output of a first cycle filters which of the possible root causes are not applicable to the current state of the data. A second output of a second cycle further filters which of the remaining possible root causes are not applicable to the current state of the data, and so on. In this embodiment, the process continues until the root cause is identified.

In some embodiments, and as shown in block 314, the process flow 300 may include the step of storing the data inputs and outputs of the real-time snapshot process for a defined period of time. The inputs and outputs of the real-time snapshot process are stored for a defined period of time. The period of time is dependent on how quickly the process resolves the network anomaly. In some embodiments, the real-time snapshot process takes up to two hours to resolve the anomaly. The process dynamically stores the data at least until the process has resolved the anomaly. In some embodiments, the real-time snapshot process is performed at a set interval. For instance, daily, weekly, and/or the like.

In some embodiments, and as shown in block 316, the process flow 300 may include the step of training a machine learning model based on inputs and outputs of the real-time snapshot process. In some embodiments, the machine learning model accepts at least one of inputs and/or outputs of the centralized platform. For instance, the at least one of inputs and/or outputs of the centralized platform are used by the machine learning model to identify incoming and/or outgoing data as data comprising anomalies or comprising no anomalies. In this embodiment, the machine learning model continuously learns how to classify the incoming or outgoing data of the centralized platform and/or how to identify the data before the data enters the real-time snapshot process. In this embodiment, the machine learning model improves the efficiency of the real-time snapshot process. For example, a first data input and/or a data output of the centralized platform trains a machine learning model to identify a second input and/or a second output as data comprising no anomalies or data comprising at least one anomaly.

In some embodiments, the machine learning model may further learn to exclude particular data types from the real-time snapshot process in order to increase the efficiency of the system. For instance, a first input of the real-time snapshot process trains a machine learning model to continuously learn at least one data type which does not conform to the expected value of the key value. In this example, the machine learning model learns to filter nonconforming data from conforming data which improves the efficiency of the computing environment. In some embodiments, the machine learning model is trained to route outgoing data of the centralized platform through the real-time snapshot process. In some other embodiments, the machine learning model is trained to route both conforming data and nonconforming data alike through the real-time snapshot process. For example, the machine learning model may be trained to identify data as conforming data such that the conforming data is not routed through the real-time snapshot process. In some embodiments, the machine learning model continuously learns from the outputs of the centralized platform. For instance, the machine learning model, continuously learns what data or data type initiates the real-time snapshot process. In a further embodiment, the machine learning model continuously learns from the outputs of the real-time snapshot process. The machine learning model may accept inputs or outputs of the real-time snapshot process to further refine the identities of each key value included in the repository.

FIG. 4 illustrates an exemplary architecture 400 for identifying a network anomaly within a distributed network, in accordance with embodiments of the disclosure. In some embodiments, a system (e.g., similar to one or more of the systems described herein with respect to FIGS. 1A-1C) may perform one or more of the steps of exemplary architecture 400. For example, a system (e.g., the system 130 described herein with respect to FIG. 1A-1C) may perform the steps of exemplary architecture 400. Additionally, and in some embodiments, a system (e.g., the system 500 described herein with respect to FIG. 5) may be used to perform the steps of exemplary system architecture 400.

In some embodiments, data from a plurality of active systems and/or devices makeup the transaction pathway. For instance, active systems include both internal and external applications. In a further embodiment, internal systems and/or devices comprise at least one of an internal web application, an internal middleware system, an internal transaction validation application, and/or an internal transaction posting application. In some embodiments, the transaction comprises an external bank application.

Data from each system and/or application of the transaction pathway, regarding at least one event occurring within the distributed network, is applied to the centralized platform. In some embodiments, a natural language processing engine accepts data from the external bank application for conversion to a compatible data type for application to the centralized platform. The data from each application or system of the transaction pathway comprises at least one event. In some embodiments, an event comprises at least one of a market-based event, a connector event, an application upgrade event, a memory event, and/or deployment code window events.

The centralized platform controls whether each identified application of the transaction pathway initiates the capture of a real-time snapshot. In some embodiments, the centralized platform communicates to the at least one identified application and/or system whether to initiate the capture of at least one real-time snapshot. In some other embodiments, the centralized platform communicates to the at least one identified application to cease the capture of the real-time snapshots. In some embodiments, the at least one application may cease the capture of real-time snapshots because the real-time snapshot process has resolved. In some other embodiments, the capture of real-time snapshots by at least one identified application ceases because the quota of data for identifying and resolving the network anomaly has been met and no further data is needed. In some embodiments, some applications of the identified applications are engaging in capturing real-time snapshots and some applications have ceased capturing real-time snapshots at the same time. For example, the centralized platform has communicated to a first application to initiate the capture of real-time snapshots, and the centralized platform has communicated to a second application to cease the capture of real-time snapshots, and/or the like. In some embodiments, the centralized platform also sets a frequency for the capture of real-time snapshots by at least one identified application. For example, the centralized platform may set a frequency of on snapshot every minute, every two minutes, and/or the like.

Application of the data to the centralized platform initiates the real-time snapshot process. In some embodiments, a machine learning model is trained to start and stop the real-time snapshot process based on the application of data to the centralized platform. In some embodiments, the application of a plurality of events to the centralized platform initiates a plurality of real-time snapshot processes. For instance, the application of data from a first event initiates a first real-time snapshot process, data from a second event initiates a second real-time snapshot process, and/or the like. In some embodiments, a plurality of related events initiates a real-time snapshot process. For instance, a first event is related to a second event and the application of both the first and second events initiates the real-time snapshot process. In some embodiments, a first event has a causal relationship with a second event. For instance, a first event comprises an application upgrade event and a second event comprises a memory event, which have a causal relationship.

The real-time snapshot process comprises capturing the state of the data at the time of the snapshot and extracting key values from each real-time snapshot. At least one key value is extracted from the at least one snapshot. In some embodiments, the identity of the key value depends on the content of the snapshot. For example, a first snapshot comprises a first data point, and a first key value is associated with the first data point, and a second snapshot comprises a second data point and a second key value is associated with the second data point. In some embodiments, the identity of each key value is defined by the at least one application of the transaction pathway. In this embodiment, each key value is a marker for expected performance of each application. In this instance, a first key value of a first application is a first marker for the expected performance of the first application, and a second key value of a second application is a second marker for the expected performance of the second application. In a further embodiment, a plurality of key values is extracted from a plurality of real-time snapshots of a plurality of real-time snapshot processes. In some embodiments, a plurality of key values is extracted from a first real-time snapshot.

The real-time snapshot process generates a repository for storing all key values of each application and the excepted value for each corresponding key value. Each extracted key value of each real-time snapshot is compared to the corresponding key value of the repository. In some embodiments, the key value of the repository is the expected value of each key value.

The real-time snapshot process continues while at least one key value of a snapshot does not conform to the corresponding key value of the repository (e.g., the expected value). In some embodiments, data outputs from a first cycle of the real-time snapshot process are routed back to the corresponding applications of the transaction pathway. The data is then applied to the centralized platform, and a second cycle of the real-time snapshot process is initiated. The cycle continues until each extracted key value of each snapshot conforms to the expected values. In some embodiments, a plurality of cycles of a plurality of real-time snapshot processes occurs individually and at the same time. For example, a first real-time snapshot process cycles, a second real-time snapshot process cycles, wherein the first real-time snapshot process completes before or after the second real-time snapshot process.

FIG. 5 illustrates an example machine learning (ML) architecture 500, in accordance with embodiments of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500.

The ML subsystem architecture may be part of the components of the environment 100 (e.g., end-point device(s) 140). The ML subsystem architecture is used to detect and prevent malfeasant targeting of individual users in a network as discussed below in reference to FIG. 3. Namely, the ML subsystem architecture may be used to train the system to determine the similarities between configurations of end-point devices and/or determine similar end-point devices.

The machine learning subsystem 500 may include a data acquisition engine 502, data ingestion engine 510, data pre-processing engine 516, ML model tuning engine 522, and inference engine 536.

The data acquisition engine 502 may identify various internal and/or external data sources to generate, test, and/or integrate new features for training the machine learning model 524. These internal and/or external data sources 504, 506, and 508 may be initial locations where the data originates or where physical information is first digitized. The data acquisition engine 502 may identify the location of the data and describe connection characteristics for access and retrieval of data. In some embodiments, data is transported from each data source 504, 506, or 508 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 504, 506, and 508 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 502 from these data sources 504, 506, and 508 may then be transported to the data ingestion engine 510 for further processing.

Depending on the nature of the data imported from the data acquisition engine 502, the data ingestion engine 510 may move the data to a destination for storage or further analysis. Typically, the data imported from the data acquisition engine 502 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 510, the data may be ingested in real-time, using the stream processing engine 512, in batches using the batch data warehouse 514, or a combination of both. The stream processing engine 512 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 514 collects and transfers data in batches according to scheduled intervals, trigger events, or any other logical ordering.

In machine learning, the quality of data and the useful information that can be derived therefrom directly affects the ability of the machine learning model 524 to learn. The data pre-processing engine 516 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 516 may implement feature extraction and/or selection techniques to generate training data 518. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 518 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 522 may be used to train a machine learning model 524 using the training data 518 to make predictions or decisions without explicitly being programmed to do so. The machine learning model 524 represents what was learned by the selected machine learning algorithm 520 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 522 may repeatedly execute cycles of experimentation 526, testing 528, and tuning 530 to optimize the performance of the machine learning algorithm 520 and refine the results in preparation for deployment of those results for consumption or decision making. To this end, the ML model tuning engine 522 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 518. A fully trained machine learning model 532 is one whose hyperparameters are tuned and model accuracy maximized. The trained machine learning model 532, similar to any other software application output, can be persisted to storage, file, memory, or application, or looped back into the processing component to be reprocessed. More often, the trained machine learning model 532 is deployed into an existing production environment to make practical business decisions based on live data 534. To this end, the machine learning subsystem 500 uses the inference engine 536 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 538) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 538) live data 534 based on how similar they are to one another to solve exploratory challenges where little is known about the data, provide a description or label (e.g., C_1, C_2 ... C_n 538) to live data 534, such as in classification, and/or the like. These categorized outputs, groups (clusters), or labels are then presented to the user input system 130. In still other cases, machine learning models that perform regression techniques may use live data 534 to predict or forecast continuous outcomes.

It will be understood that the embodiment of the machine learning subsystem 500 illustrated in FIG. 5 is example and that other embodiments may vary. As another example, in some embodiments, the machine learning subsystem 500 may include more, fewer, or different components.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for identifying and resolving an anomaly within a distributed network, the system comprising:
at least one non-transitory storage device containing instructions; and
at least one processing device coupled to the at least one non-transitory storage device, wherein the at least one processing device, upon execution of the instructions, is configured to:
detect an event within the distributed network, wherein the event comprises at least one anomaly within the distributed network;
identify at least one application associated with the event;
apply data associated with the at least one event to a centralized platform;
control whether an identified application initiates the capture of at least one real-time snapshot, wherein the centralized platform communicates to each identified application whether to initiate the capture of at least one real-time snapshot;
initiate a real-time snapshot process;
extract at least one key value from each real-time snapshot;
compare each of the at least one extracted key values to an expected value for each extracted key value;
identify the anomaly within the distributed network by identifying data which does not conform to the expected value for each extracted key value; and
resolve the at least one anomaly within the distributed network when each extracted key value conforms to the expected value, wherein identification and resolution of a root cause of the at least one anomaly within the distributed network comprises:
assembling a transaction pathway, wherein the transaction pathway is comprised of at least one application which has been labelled as having data associated with the event;
generating a repository comprised of at least one key value associated with the event, wherein each key value of the repository is associated with at least one application of the transaction pathway;
filtering each of the at least one extracted key values from each real-time snapshot based on whether the data conforms or does not conform to the corresponding key value of the repository;
routing filtered data through the real-time snapshot process;
updating the real-time snapshot process with data from each real-time snapshot for each cycle of the real-time snapshot process;
resolving the root cause of the anomaly within the distributed network when each extracted key value of the at least one real-time snapshot conforms to the expected value for each corresponding key value of the repository;
storing the data from the real-time snapshot process for a defined period of time; and
training a machine learning model based on inputs and outputs of the real-time snapshot process.

2. The system of claim 1, wherein the at least one application of the transaction pathway is predetermined by at least one of an application of the transaction pathway or an application external to the transaction pathway.

3. The system of claim 1, wherein the real-time snapshot process identifies the root cause of the anomaly using at least one of an updating input or an updating output from the centralized platform, or at least one of an updating input or updating output from the real-time snapshot process.

4. The system of claim 1, wherein a machine learning model accepts numerical and/or natural language processing data types from each of the extracted key values and resolves the root cause of the identified anomaly within the distributed network within at least one iteration.

5. The system of claim 1, wherein the at least one processing device, upon execution of the instructions, is configured to identify and resolve the root cause of the at least one anomaly within the distributed network, and wherein identification and resolution of the root cause further comprises instructions for the processing device to:
train a first machine learning model using a first training set, wherein the first training set is created from at least one of an input or output of the centralized platform; and
train a second machine learning model using a second training set, wherein the second training set is created from at least one of an input or output of the real-time snapshot process.

6. The system of claim 1, wherein each key value is predefined based on at least one of expected limits of the key value or an expected performance for each key value.

7. The system of claim 1, wherein the identity of the at least one key value for extraction is predetermined by at least one application or from a source external to the at least one application.

8. The system of claim 1, wherein the event comprises at least one of a market-based event, a memory storage event, or an application upgrade event.

9. The system of claim 1, wherein the data associated with the at least one application is converted to a compatible format for application to the centralized platform.

10. A computer program product for identifying and resolving an anomaly within a distributed network, the computer program product comprising at least one non-transitory computer-readable medium having computer-readable program code portions embodied therein, the computer-readable program code portions which when executed by a processing device are configured to cause the processor to perform the following operations:
  detect an event within the distributed network, wherein the event comprises at least one anomaly within the distributed network;
  identify at least one application associated with the event;
  apply data associated with the at least one event to a centralized platform;
  control whether at least one identified application captures a real-time snapshot, wherein the centralized platform communicates to each identified application whether to initiate the capture of at least one real-time snapshot;
  initiate a real-time snapshot process;
  extract at least one key value from each real-time snapshot;
  compare each extracted key value to an expected value for each extracted key value;
  identify an anomaly within the distributed network by identifying data which does not conform to the expected value for each extracted key value; and
  resolve the at least one anomaly within the distributed network when each extracted key value conforms to the expected value, wherein identification and resolution of a root cause of the at least one anomaly within the distributed network comprises:
    assembling a transaction pathway, wherein the transaction pathway is comprised of at least one application which has been labelled as having data associated with the event;
    generating a repository comprised of at least one key value associated with the event, wherein each key value of the repository is associated with at least one application of the transaction pathway;
    filtering each of the at least one extracted key values from each real-time snapshot based on whether the data conforms or does not conform to the corresponding key value of the repository;
    routing filtered data through the real-time snapshot process;
    updating the real-time snapshot process with data from each real-time snapshot for each cycle of the real-time snapshot process;
    resolving the root cause of the anomaly within the distributed network when each extracted key value of the at least one real-time snapshot conforms to the expected value for each corresponding key value of the repository;
    storing the data from the real-time snapshot process for a defined period of time; and
    training a machine learning model based on inputs and outputs of the real-time snapshot process.

11. The computer program product of claim 10, wherein each key value is predefined based on at least one of an expected limit of the event or an expected performance for each key value.

12. The computer program product of claim 10, wherein the identity of the at least one key value for extraction is predetermined by at least one application or from a source external to the at least one application.

13. The computer program product of claim 10, wherein the data associated with the at least one application is converted to a compatible format for application to the centralized platform.

14. A computer-implemented method for identifying and resolving an anomaly within a distributed network, the computer-implemented method comprising:
  detecting an event within the distributed network, wherein the event comprises at least one anomaly within the distributed network;
  identifying at least one application associated with the event;
  applying data associated with the at least one event to a centralized platform;
  controlling whether at least one identified application initiates the capture of at least one real-time snapshot, wherein the centralized platform communicates to each identified application whether to initiate the capture of at least one real-time snapshot;
  initiating a real-time snapshot process;
  extracting at least one key value from each real-time snapshot;
  comparing each of the at least one extracted key values to an expected value for each extracted key value;
  identifying an anomaly within the distributed network by identifying data which does not conform to the expected value for each extracted key value; and
  resolving the at least one anomaly within the distributed network when each extracted key value conforms to the expected value, wherein identification and resolution of a root cause of the at least one anomaly within the distributed network comprises:
    assembling a transaction pathway, wherein the transaction pathway is comprised of at least one application which has been labelled as having data associated with the event;
    generating a repository comprised of at least one key value associated with the event, wherein each key value of the repository is associated with at least one application of the transaction pathway;
    filtering each of the at least one extracted key values from each real-time snapshot based on whether the data conforms or does not conform to the corresponding key value of the repository;
    routing filtered data through the real-time snapshot process;
    updating the real-time snapshot process with data from each real-time snapshot for each cycle of the real-time snapshot process;
    resolving the root cause of the anomaly within the distributed network when each extracted key value of the at least one real-time snapshot conforms to the expected value for each corresponding key value of the repository;
    storing the data from the real-time snapshot process for a defined period of time; and
    training a machine learning model based on inputs and outputs of the real-time snapshot process.

15. The method of claim 14, wherein each key value is predefined based on at least one of an expected limit of the event or an expected performance for each key value.

16. The method of claim 14, wherein the identity of the at least one key value for extraction is predetermined by at least one application or from a source external to the at least one application.

17. The method of claim 14, wherein the data associated with the at least one application is converted to a compatible format for application to the centralized platform.

* * * * *